United States Patent
Park et al.

(10) Patent No.: US 11,093,441 B2
(45) Date of Patent: Aug. 17, 2021

(54) MULTI-CORE CONTROL SYSTEM THAT DETECTS PROCESS DEPENDENCIES AND SELECTIVELY REASSIGNS PROCESSES

(71) Applicant: Samsung Electronics Co., Ltd., Suwon-si (KR)

(72) Inventors: Jong-Lae Park, Anyang-si (KR); Soo Hyun Kim, Yongin-si (KR); Young Tae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 300 days.

(21) Appl. No.: 15/969,964

(22) Filed: May 3, 2018

(65) Prior Publication Data
US 2019/0155785 A1    May 23, 2019

(30) Foreign Application Priority Data

Nov. 20, 2017  (KR) .......................... 10-2017-0154636

(51) Int. Cl.
| | |
|---|---|
| G06F 9/48 | (2006.01) |
| G06F 15/82 | (2006.01) |
| G06F 11/30 | (2006.01) |
| G06F 11/34 | (2006.01) |

(52) U.S. Cl.
CPC .......... *G06F 15/82* (2013.01); *G06F 11/3024* (2013.01); *G06F 11/3409* (2013.01); *G06F 11/3433* (2013.01)

(58) Field of Classification Search
CPC ..... G06F 9/4856; G06F 9/4831; G06F 9/4881
See application file for complete search history.

(56) References Cited

U.S. PATENT DOCUMENTS

| | | | |
|---|---|---|---|
| 7,496,918 B1 * | 2/2009 | Dice ...................... | G06F 9/524 709/225 |
| 8,069,446 B2 | 11/2011 | Zhao et al. | |
| 8,544,014 B2 | 9/2013 | Gopalan et al. | |
| 8,549,524 B2 | 10/2013 | Jula | |
| 8,661,440 B2 | 2/2014 | Cho | |
| 8,799,547 B2 | 8/2014 | Mahadevan et al. | |
| 8,869,153 B2 | 10/2014 | Krieger et al. | |
| 8,897,372 B2 | 11/2014 | Nishihara et al. | |

(Continued)

FOREIGN PATENT DOCUMENTS

| | | |
|---|---|---|
| KR | 10-1375836 B1 | 4/2014 |
| KR | 10-1684677 B1 | 12/2016 |
| KR | 10-1703328 B1 | 2/2017 |

OTHER PUBLICATIONS

Bjorn B. Brandenburg. "A Fully Preemptive Multiprocessor Semaphore Protocol for Latency-Sensitive Real-Time Applications" 25th Euromicro Conference on Real-Time Systems. (Year: 2013).*

(Continued)

*Primary Examiner* — Jacob Petranek
(74) *Attorney, Agent, or Firm* — Muir Patent Law, PLLC

(57) ABSTRACT

Provided are multi-core control systems. A multi-core control system includes multiple cores including a first core; and a process dependency recognizer configured to recognize a dependency between processes each executed in the respective cores, wherein if the first core waits for a first period of time to execute a first process, the first core recognizes a process on which the first process depends by the process dependency recognizer.

20 Claims, 15 Drawing Sheets

(56) References Cited

U.S. PATENT DOCUMENTS

| | | | |
|---|---|---|---|
| 9,189,282 B2 | 11/2015 | Conte et al. | |
| 9,317,331 B1 | 4/2016 | Koh et al. | |
| 9,417,935 B2 | 8/2016 | Gounares et al. | |
| 9,424,092 B2 | 8/2016 | Singh et al. | |
| 9,578,091 B2 | 2/2017 | Chaliparambil et al. | |
| 9,594,859 B1 | 3/2017 | Padalia et al. | |
| 9,612,867 B2 | 4/2017 | Chung et al. | |
| 9,619,284 B2 | 4/2017 | Sakarda | |
| 2006/0282836 A1* | 12/2006 | Barker | G06F 9/4887 |
| | | | 718/103 |
| 2013/0298137 A1* | 11/2013 | Yamauchi | G06F 9/46 |
| | | | 718/105 |
| 2014/0196050 A1* | 7/2014 | Yu | G06F 9/5088 |
| | | | 718/104 |
| 2015/0186184 A1 | 6/2015 | Kim | |
| 2015/0205644 A1* | 7/2015 | Ito | G06F 9/52 |
| | | | 718/103 |
| 2016/0004569 A1* | 1/2016 | Kim | G06F 9/5027 |
| | | | 718/104 |
| 2017/0060633 A1* | 3/2017 | Suarez Gracia | G06F 9/48 |

OTHER PUBLICATIONS

Sridhar Gopaly, Sriram Vajapeyam. "Load Balancing in a Heterogeneous Computing Environment" IEEE, 1998 (Year: 1998).*
Hassan Salamy "An effective approach to schedule time reduction on multi-core embedded systems" Computers & Electrical Engineering vol. 64, Nov. 2017, pp. 15-33, available online Jul. 9, 2016 (Year: 2016).*

* cited by examiner

MULTI-CORE CONTROL SYSTEM THAT DETECTS PROCESS DEPENDENCIES AND SELECTIVELY REASSIGNS PROCESSES

This application claims the benefit of priority under 35 U.S.C. to Korean Patent Application No. 10-2017-0154636, filed on Nov. 20, 2017, in the Korean Intellectual Property Office, the disclosure of which is incorporated herein by reference in its entirety.

BACKGROUND

1. Field of the Disclosure

The present disclosure relates to a multi-core control system.

2. Description of the Related Art

An application processor including multiple cores may assign to each of the cores a process associated with a task requested from a host. In doing so, a process that takes a relatively long time or that requires complex computation may be assigned to a high-performance core, while a process that takes a relatively short time or that requires simple calculation may be assigned to a low-performance core.

If a process assigned to a low-performance core has to be processed before a process assigned to a high-performance core, the high-performance core must wait until the low-performance core processes the process. As a result, the high-performance core cannot exhibit its performance sufficiently, and thus the performance may be degraded.

This issue can be addressed by defining in advance the processes which depend on one another so that they are executed in the same core. To do so, a scheduler unit is set to have predefined data. In addition, in an open system where various applications can be installed, the dependency is updated whenever a new process is added, which is impractical.

SUMMARY

Aspects of the present disclosure provide a method for preventing the performance of a multi-core system from being degraded.

This and other aspects, embodiments and advantages of the present disclosure will become immediately apparent to those of ordinary skill in the art upon review of the Detailed Description and Claims to follow.

According to certain aspects, the disclosure is directed to a multi-core control system comprising: multiple cores, including a first core and a second core; and a process dependency recognizer unit configured to identify a dependency between a first process executed in the first core and a second process executed in the second core, the first process being dependent on the second process, wherein the multi-core control system is configured such that when the first core waits for a first length of time to execute the first process, the first core transmits to the process dependency recognizer unit a request to identify the second process, and wherein, in response to the request to identify the second process transmitted from the first core, the process dependency recognizer unit identifies the second process, and transmits to the first core information identifying the second process.

According to certain aspects, the disclosure is directed to a multi-core control system comprising: a first core having a first processing speed; a second core having a second processing speed; and a scheduler unit configured to assign a first process to the first core and a second process to the second core, the first process depending on the second process, wherein the multi-core control system is configured such that when the first core waits for a first length of time to execute the first process, the first core evaluates the first processing speed and second processing speed and determines if the first processing speed is greater than the second processing speed, and when the first core determines that the first processing speed is greater than the second processing speed, the first core requests the scheduler unit to reassign the second process to a third core that has a third processing speed greater than the second processing speed.

According to certain aspects, the disclosure is directed to a multi-core control system comprising: multiple cores, wherein the multiple cores include a first core and a second core; a scheduler unit configured to assign a first process to the first core and a second process to the second core; a process dependency recognizer unit configured to identify a dependency between the first process and the second process; and a core performance recognizer unit configured to determine performance of each of the multiple cores, wherein the first core is configured to: wait for a first period of time to execute the first process, and after waiting, receive first information on a process on which the first process depends from the process dependency recognizer unit; receive second information on a first processing speed of the first core and a second processing speed of a second core from the core performance recognizer unit, based on the first information; and send a request to reassign the second process to the scheduler unit, based on the second information.

According to certain aspects, the disclosure is directed to a system-on-chip comprising: an interface configured to receive a task request from a host; a first core and a second core, each configured to execute the task request; and a scheduler unit configured to assign a first process to the first core and a second process to the second core, wherein the first process is associated with the requested task, and the second process is associated with the requested task and precedes the first process in a processing order, wherein the first core is configured to: determine if the first process depends on the second process, if the first core waits for a first period of time to execute the first process, determine if a first processing speed of the first core is greater than a second processing speed of the second core, if the first core determines that the first process depends on the second process, and request the scheduler unit to reassign the second process to a third core having a third processing speed greater than the second processing speed, if the first core determines that the first processing speed is greater than the second processing speed.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
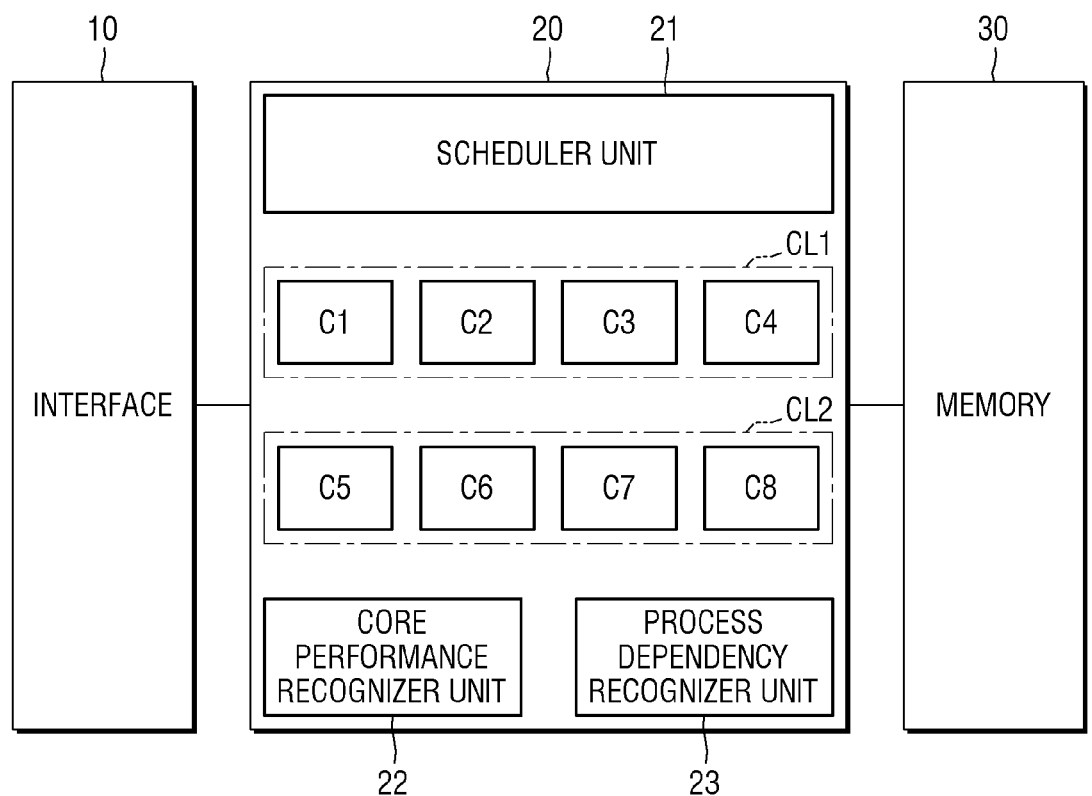
FIG. 1 is a block diagram of a system-on-chip including a multi-core control system, according to some example embodiments of the present disclosure.
Figure 2:
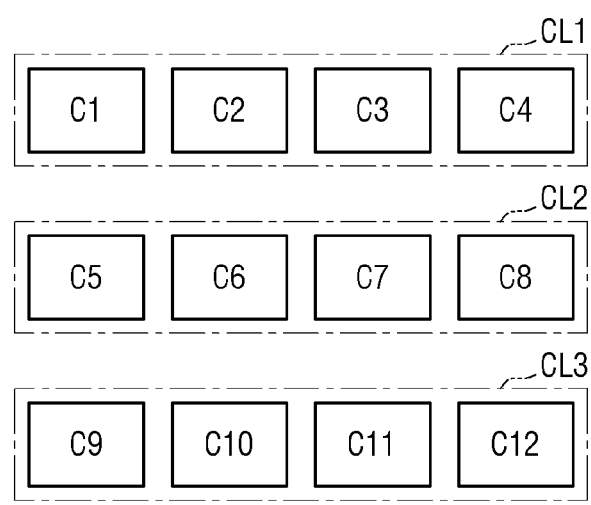
FIG. 2 is a diagram for illustrating an example of the structure of multiple cores included in the multi-core control system, according to some example embodiments of the present disclosure.
Figure 3:
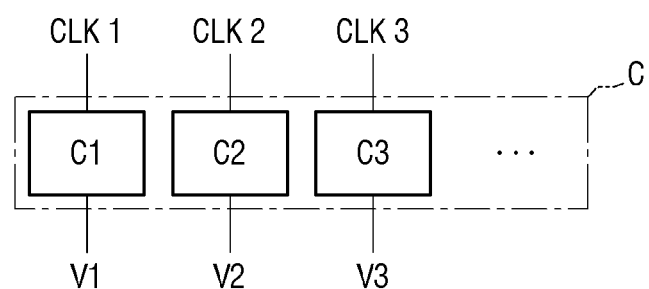
FIG. 3 is a diagram for illustrating another example of the structure of multiple cores included in the multi-core control system, according to some example embodiments of the present disclosure.
Figure 4:
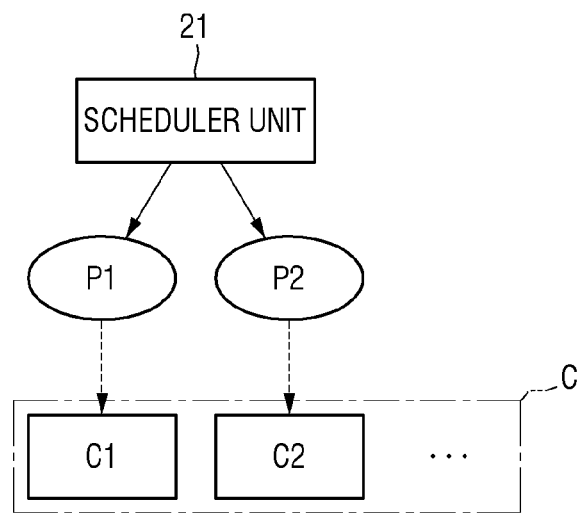
FIG. 4 is a diagram for illustrating an example of a method for assigning processes to multiple cores by a scheduler unit included in the multi-core control system, according to some example embodiments of the present disclosure.

FIG. 1 is a block diagram of a system-on-chip including a multi-core control system according to some example embodiments of the present disclosure. FIG. 2 is a diagram for illustrating an example of the structure of multiple cores included in the multi-core control system according to some example embodiments of the present disclosure. FIG. 3 is a diagram for illustrating another example of the structure of multiple cores included in the multi-core control system according to some example embodiments of the present disclosure. FIG. 4 is a diagram for illustrating an example of a method for assigning processes to multiple cores by a scheduler unit included in the multi-core control system according to some example embodiments of the present disclosure.

Referring to FIG. 1, a system-on-chip 1 may include an interface 10, a multi-core control system 20, and a memory 30. It is to be noted that the above-listed elements are not essential for implementing the first system-on-chip 1. Additional elements may be added or some of the listed elements may be eliminated.

The system-on-chip 1 may be included in a mobile computing device. The mobile computing device may be one of a mobile phone, a smart phone, an enterprise digital assistant (EDA), a digital still camera, a digital video camera, a portable multimedia player (PMP), a personal navigation device or a portable navigation device (PND), a mobile internet device (MID), a wearable computer, an internet of things (IOT) device, an internet of everything (IOE), and an e-book.

The interface 10 may transmit/receive data, task requests, etc. to/from a host (not shown). For example, the interface 10 may receive a task request from a host.

Although not illustrated, the interface 10 may be connected to the host via a parallel AT attachment (PATA) bus, a serial AT attachment (SATA) bus, SCSI, USB, PCIe, etc.

The multi-core control system 20 may include multiple cores C1 to C8, a scheduler unit 21, a core performance recognizer unit 22, and a process dependency recognizer unit 23. It is to be noted that the above-listed elements are not essential for implementing the multi-core control system 20. Additional elements may be added or some of the listed elements may be eliminated.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Although FIG. 1 shows that multi-core control system 20 includes eight cores C1 to C8, the number of cores may vary in some example embodiments. For example, referring to FIG. 2, the multi-core control system may include twelve cores C1 to C12.

Referring again to FIG. 1, the multiple cores C1 to C8 each may be a processing unit that is configured to execute computer instructions to perform specific actions. The multiple cores C1 to C8 may be either homogeneous processor cores or heterogeneous processor cores.

When the cores C1 to C8 are heterogeneous processor cores, they may be sorted into a first cluster CL1 and a second cluster CL2. Among the multiple cores C1 to C8, the first cluster CL1 may include high-performance cores C1 to C4 having a first processing speed, and the second cluster CL2 may include low-performance cores C5 to C8 having a second processing speed that is smaller than the first processing speed.

Referring again to FIG. 2, if the cores C1 to C12 are heterogeneous processor cores, they may be sorted into first, second, and third clusters CL1, CL2, and CL3. In this example, the first cluster CL1 may include high-performance cores C1 to C4 having the first processing speed among the multiple cores C1 to C12. The second cluster CL2 may include low-performance cores C5 to C8 having a second processing speed that is slower than the first processing speed among the multiple cores C1 to C12. The third cluster CL3 may include intermediate-performance cores C9 to C12 having a third processing speed which is slower than the first processing speed and faster than the second processing speed among the multiple cores C1 to C12.

According to some example embodiments of the present disclosure, the multiple cores C1 to C8 may have per-core dynamic voltage and frequency scaling (DVFS) architecture.

Referring to FIG. 3, for example, in the per-core DVFS architecture, voltages having different levels and clocks having different frequencies may be supplied to the multiple cores C, respectively.

For example, the level of a first voltage V1 supplied to the first core C1 may be different from the level of a second voltage V2 supplied to the second core C2, and the level of a third voltage V3 supplied to the third core C3. It is, however, to be understood that this is merely illustrative. The level of the first voltage V1 may be equal to the level of one of the second voltage V2 and the third voltage V3 and may be different from the level of the others.

A first frequency of a first clock signal CLK1 supplied to the first core C1 may be different from a second frequency of a second clock signal CLK2 supplied to the second core C2 and from a third frequency of a third clock signal CLK3 supplied to the third core C3. It is, however, to be understood that this is merely illustrative. The frequency of the first clock signal CLK1 may be equal to the frequency of one of the second clock signal CLK2 or the third clock signal CLK3 and may be different from the frequency of the other.

Referring back to FIG. 1, the multiple cores C1 to C8 may be operated independently. For example, while the first core C1 executes a first process, the second core C2 may execute a second process that is different from the first process.

The scheduler unit 21 may assign each of the processes associated with the tasks requested from the host via the interface 10 to the respective cores C1 to C8.

For example, referring to FIG. 4, when the processes associated with a task requested from the host include a first process P1 and a second process P2, the scheduler unit 21 may select cores to execute the first process P1 and the second process P2 from among the cores C. The scheduler unit 21 may select a core to execute the first process P1 as a first core C1 and a core to execute the second process P2 as the second core C2 from among the multiple cores C. In this instance, the scheduler unit 21 may assign the first process P1 to the first core C1 and the second process P2 to the second core C2.

After assigning the processes to the multiple cores C1 to C8, if it is recognized that the performance of any of the cores C1 to C8 is degraded, the scheduler unit 21 may assign the process assigned to the core with degraded performance to another core.

Referring back to FIG. 1, the core performance recognizer unit 22 may recognize the performance of each of the multiple cores C1 to C8, and may recognize a difference in performance between the cores C1 to C8. As used herein, the performance may refer to a processing speed at which a core executes a process (for example, data per unit time). A method for recognizing the difference in performance between the multiple cores C1 to C8 will be described later in detail with reference to FIGS. 9 to 13.

If the first core C1 requests the core performance recognizer unit 22 to determine a difference in performance between the first core C1 and the fifth core C5, the core performance recognizer unit 22 may determine the difference and transmit the information on the difference to the first core C1. It is, however, to be understood that this is merely illustrative. The core performance recognizer unit 22 may determine the difference in performance between the first core C1 and the fifth core C5, evaluate which of the first core C1 and the fifth core C5 has the better performance, and may transmit the information indicative of the core that has better performance to the first core C1.

In some implementations, the core performance recognizer unit 22 may not be included in the multi-core control system 20. In such implementations, first information on the performance of each of the multiple cores C1 to C8 may be stored in the memory 30. Each of the multiple cores C1 to C8 may read the first information from the memory 30 when necessary to determine the difference in the performance with other cores.

The process dependency recognizer unit 23 may identify dependencies between processes each executed in the respective cores. In some embodiments, the process dependency recognizer unit 23 may identify and track the relationships between differences processes, including determining which processes have dependencies on other processes, and what those dependencies consist of. The process dependency recognizer unit 23 may identify dependencies between processes in response to a request transmitted from the first core C1 to the process dependency recognizer unit 23. The dependency between processes may refer to, for example, the relationship that the second process must be executed in advance of the first process being executed or that execution of the second process must be completed before the first process can begin execution. This will be described in more detail below with reference to FIGS. 5 and 6.

Figure 5:
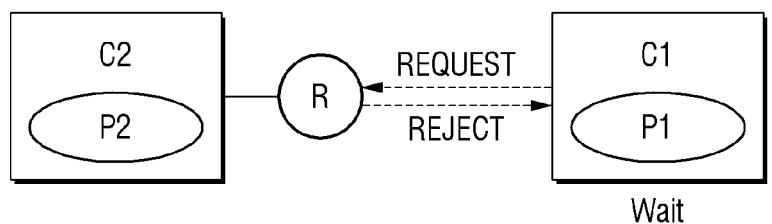
FIG. 5 is a diagram for illustrating an example of dependent relationship between processes.
Figure 6:
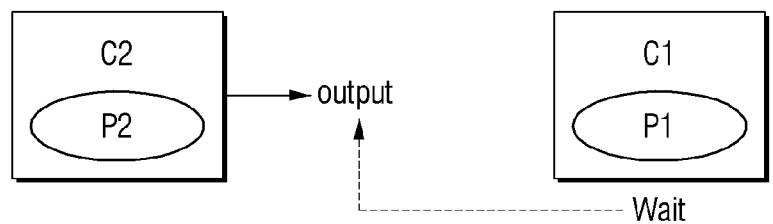
FIG. 6 is a diagram for illustrating another example of dependent relationship between processes.

FIGS. 5 and 6 are diagrams for illustrating examples of dependent relationships between processes. In the examples of FIGS. 5 and 6, a first process may depend on a second process in that the first process cannot begin until the second process completes. If this is the case, the system may migrate the second process to a faster core in order to speed up execution of the second process and thereby allow the first process to begin earlier.

In the examples shown in FIGS. 5 and 6, it is assumed that the first process P1 is assigned to the first core C1 to be executed in the first core C1, and the second process P2 is assigned to the second core C2 to be executed in the second core C2.

In the example shown in FIG. 5 where the second core C2 occupies a shared resource R to execute the second process P2, if the first core C1 requests to occupy the shared resource R in order to execute the first process P1, the request of the first core C1 may be rejected. Therefore, the first core C1 has to wait until the second core C2 completes the execution of the second process P2 in order to execute the first process P1. This may be said that the first process P1 depends on the second process P2. The shared resource may be a special function register (SFR) memory that is a hardware shared resource or may be a shared resource such as a mutex or a semaphore.

Referring to FIG. 6, if the first process P1 executed in the first core C1 waits for the output of the second process P2 executed in the second core C2, it may be said that the first process P1 depends on the second process P2.

For example, if the second process P2 is a process for drawing data to be displayed on the screen (e.g., Render-Thread), and the first process P1 is a process for moving the data output from the second process P2 to a frame buffer (e.g., surfaceflinger), then the first process P1 has to wait for the data output through the second process P2. In this instance, it may be said that the first process P1 depends on the second process P2.

On the other hand, if the first process P1 waits for the output of the second process P2 and the second process P2 waits for the output of the first process P1, it may be said that the first process P1 and the second process P2 have bidirectional dependency. However, this results in a deadlock, which can cause system stability issues. Therefore, cases where the first process P1 and the second process P2 have bidirectional dependency will not be discussed herein.

Referring again to FIG. 1, the memory 30 may store information on the performance of each of the multiple cores C1 to C8. The information on the performance of each of the multiple cores C1 to C8 may include, for example, information on the processing speed of each of the multiple cores C1 to C8. The information on the processing speed of each of the multiple cores C1 to C8 may include, for example, information on a million instructions per second (MIPS) value of each of the multiple cores.

The memory 30 may be implemented as a volatile memory such as a static random access memory (SRAM). The volatile memory may be implemented as one of a random access memory (RAM), a static RAM (SRAM), a dynamic RAM (DRAM), a synchronous DRAM (SDRAM), a thyristor RAM (T-RAM), a zero capacitor RAM (Z-RAM) and a twin transistor RAM (TTRAM). It is, however, to be understood that this is merely illustrative. The memory 30 may be implemented as a non-volatile memory.

Figure 7:
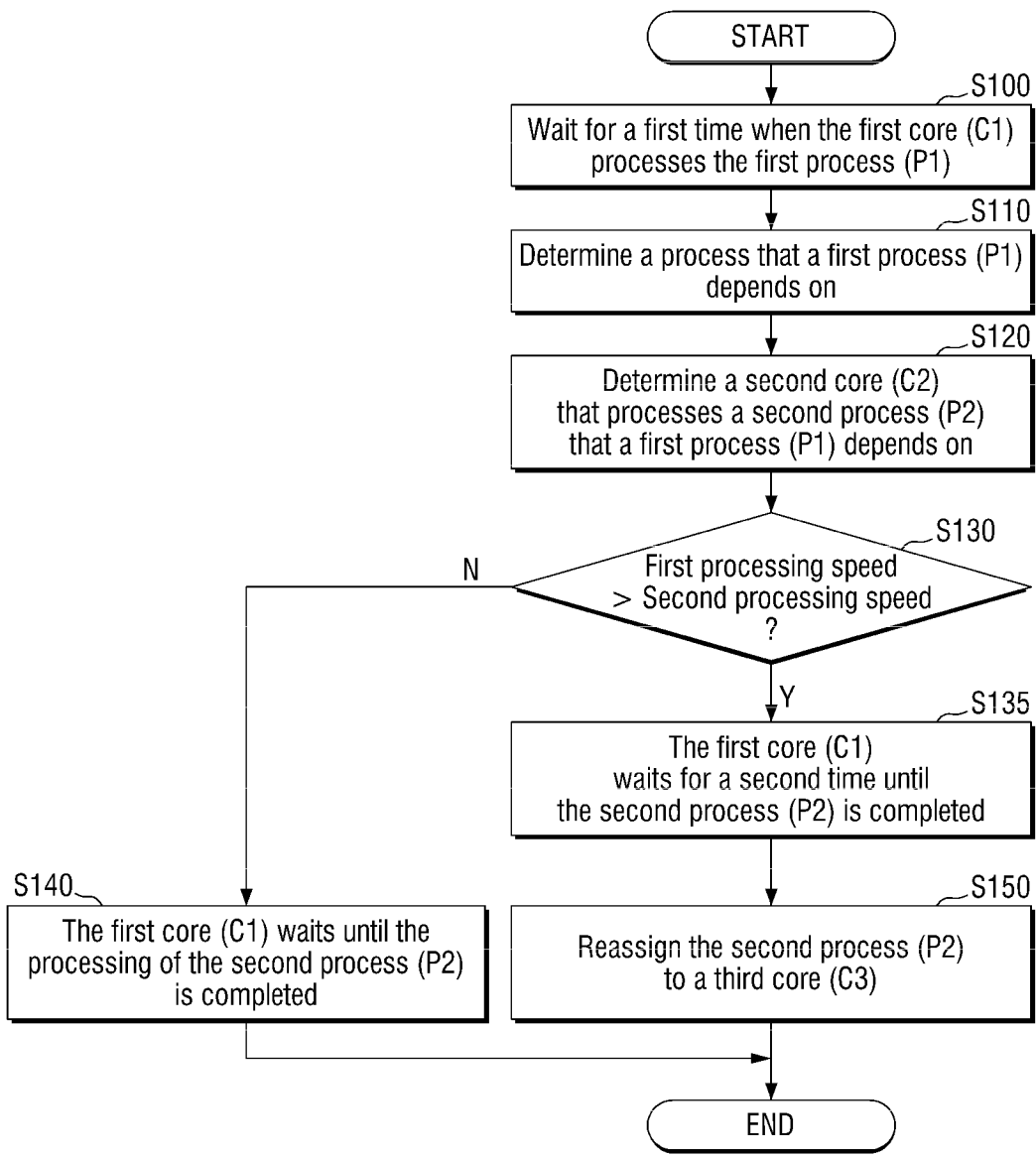
FIG. 7 is a flowchart for illustrating an example of a method for preventing degradation in the performance of cores in a multi-core control system, according to some example embodiments of the present disclosure.
Figure 8:
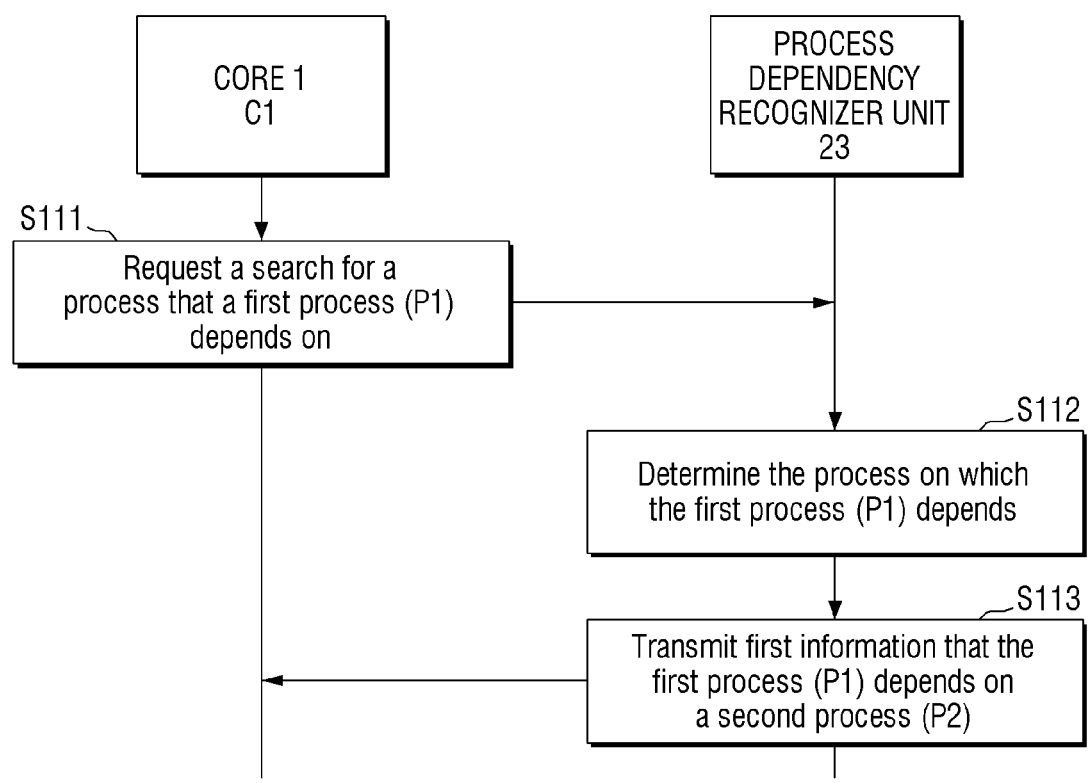
FIG. 8 is a diagram for illustrating an example of a method for recognizing dependency between processes in a multi-core control system, according to some example embodiments of the present disclosure.

FIG. 7 is a flowchart for illustrating an example of a method for preventing degradation in the performance of cores in a multi-core control system according to some example embodiments of the present disclosure. FIG. 8 is a diagram for illustrating an example of a method for recognizing dependency between processes in a multi-core control system according to some example embodiments of the present disclosure. FIGS. 9 to 13 are flowcharts for illustrating an example of a method for recognizing processing speeds of the cores in a multi-core control system according to some example embodiments of the present disclosure. For brevity, descriptions will be made focusing on differences from the above example embodiments described with reference to FIGS. 1 to 6, and the redundant description will be omitted.

In the following description with reference to FIGS. 7 to 13, it is assumed that a multi-core control system includes a first core having a first processing speed and a second core having a second processing speed that is smaller than the first processing speed. It is also assumed that a first process is assigned to the first core, and a second process is assigned to the second core.

Referring to FIG. 7, the first core C1 may wait for a first period of time to execute the first process P1 (step S100). The first period of time may be a predetermined period of time. For example, the first period of time may be an amount or length of time that results in degradation in the performance of the first core C1.

If the first core C1 waits for the first period of time in step S100, the first core C1 may recognize the process on which the first process P1 depends (step S110). Specifically, if the first core C1 waits for the first period of time to execute the first process P1, it may recognize the process that the first process P1 depends on by the process dependency recognizer unit 23 (see FIG. 1).

For example, referring to FIG. 8, if the first core C1 waits for the first period of time to execute the first process P1, it may request the process dependency recognizer unit 23 search for a process that the first process P1 depends on (step S111). In doing so, the first core C1 may send a request signal to the process dependency recognizer unit 23.

Upon receiving the request signal from the first core C1, the process dependency recognizer unit 23 may identify the process on which the first process P1 depends (step S112). For example, the process dependency recognizer unit 23 may identify a process executed by a different core that precedes the first process P1 in a processing order, which is one example of a process on which the first process P1 depends. For example, if the first process P1 relies on data output as a result of a second process P2, then the first process P1 is considered to be dependent on the second process P2, and the first process P1 will wait for the second process P2 to complete execution before proceeding.

If the process dependency recognizer unit 23 determines in step S112 that the process on which the first process P1 depends is the second process P2, it may transmit to the first core C1 first information indicating that the first process P1 depends on the second process P2 (step S113). For example, the first information may be a response message that identifies the second process P2.

The first core C1 may recognize that the first process P1 depends on the second process P2 based on the first information received in connection with step S113. For example, if the first core C1 transmits a request message to the process dependency recognizer unit 23, then the first core C1 may recognize the contents of a response message (e.g., the identity of the second process P2) received in response to the transmitted request message as the first information.

Referring again to FIG. 7, if the first core C1 recognizes in step S110 that the first process P1 depends on the second process P2, the first core C1 may identify the second core C2 that executes the second process (step S120).

For example, the multiple cores included in the multi-core control system may share information indicating which core executes which process. Therefore, the first core C1 may search the multiple cores for a core that is executing the second process P2 and may determine that the second core C2 is executing the second process P2. In some embodiments, the first core C1 may transmit requests simultaneously to every other core operating in the multi-core control system, requesting information about the second process P2, and may receive from each of the other cores a confirmation or denial that the core is executing the second process P2. In other embodiments, the first core C1 may transmit requests sequentially to the other cores operating in the multi-core control system, requesting information about the second process P2. For example, the first core C1 may transmit a request only to the second core C2, and await the response from the second core C2 before transmitting the request to a next core (e.g., third core C3), and so on.

If the first core C1 determines in step S120 that the second process P2 is executed in the second core C2, it may check if the first processing speed of the first core C1 is greater than the second processing speed of the second core C2 to determine whether the first processing speed is greater than the second processing speed (step S130). If the first processing speed is greater than the second processing speed, the performance of the first core C1 may be degraded. For example, when the first core C1 waits on processing of the second core C2 to be completed, and the processing speed of the second core C2 is less than the processing speed of the first core C1, the performance of the first core C1 may be slowed.

Figure 9:
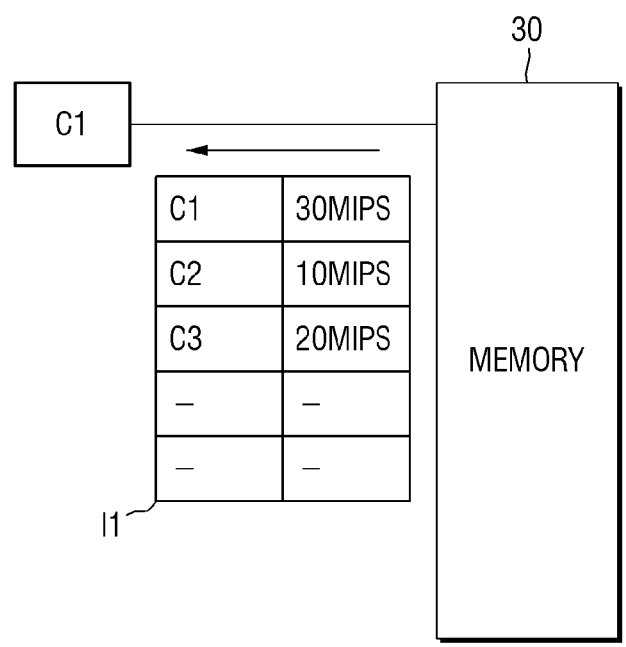
FIG. 9 is a diagram for illustrating an example of a method for recognizing processing speeds of multiple cores in a multi-core control system, according to some example embodiments of the present disclosure.

For example, referring to FIG. 9, the first core C1 may read the information I1 on the MIPS value of each of the multiple cores stored in the memory 30. The first core C1 evaluates the information indicating that the MIPS value of the first core C1 is 30 MIPS and the information indicating that the MIPS value of the second core C2 is 10 MIPS based on the information I1 read from the memory 30, and determines that the first processing speed of the first core C1 is greater than the second processing speed of the second core C2.

Figure 10:
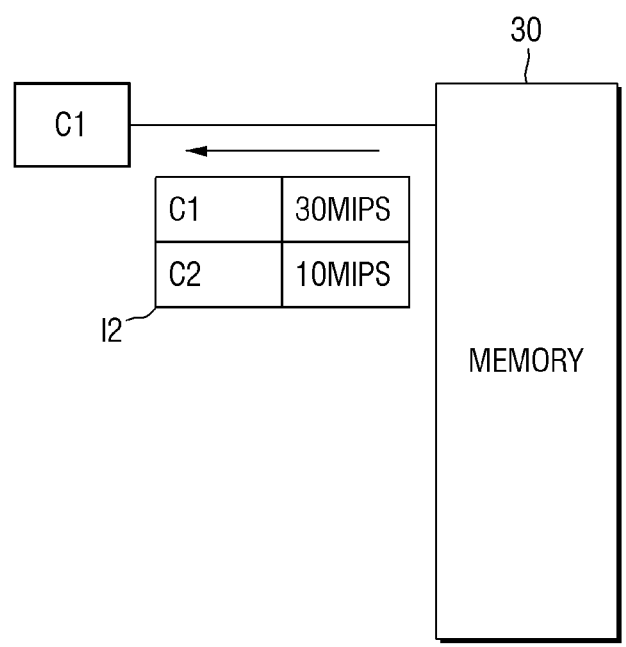
FIG. 10 is a diagram for illustrating another example of a method for recognizing processing speeds of multiple cores in a multi-core control system, according to some example embodiments of the present disclosure.

For another example, referring to FIG. 10, the first core C1 may read only information I2 on the MIPS values of the first core C1 and the second core C2 from the information on the MIPS value of each of the multiple cores stored in the memory 30. The first core C1 may recognize that the MIPS value of the first core C1 is 30 MIPS and the MIPS value of the second core C2 is 10 MIPS based on the information I2 read from the memory 30. In this instance, the first core C1 may recognize that the first processing speed of the first core C1 is greater than the second processing speed of the second core C2.

According to some example embodiments of the present disclosure, the first core C1 may also recognize which of the first core C1 and the second core C2 is faster based on information provided by the core performance recognizer unit 22.

Figure 11:
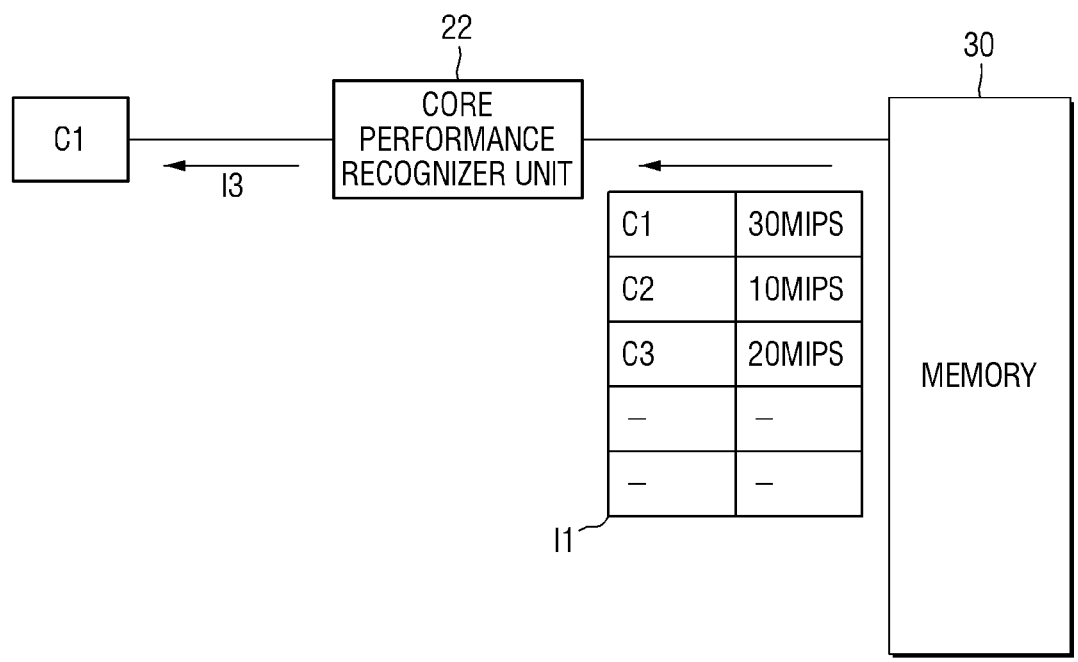
FIG. 11 is a diagram for illustrating another example of a method for recognizing processing speeds of multiple cores in a multi-core control system, according to some example embodiments of the present disclosure.

For example, referring to FIG. 11, the first core C1 may request the core performance recognizer unit 22 for information indicating which one of the first core C1 and the second core C2 is faster. Upon receiving the request, the core performance recognizer unit 22 may read the information I1 on the MIPS value of each of the multiple cores stored in the memory 30. The core performance recognizer unit 22 may evaluate the processing speeds of the first core C1 and the second core C2 using the read information I1 and may determine the faster one of them. When the core performance recognizer unit 22 determines that the first core C1 is the faster one of the two cores, it may transmit information I3 to the first core C1 indicating that the first core C1 is the faster core.

Figure 12:
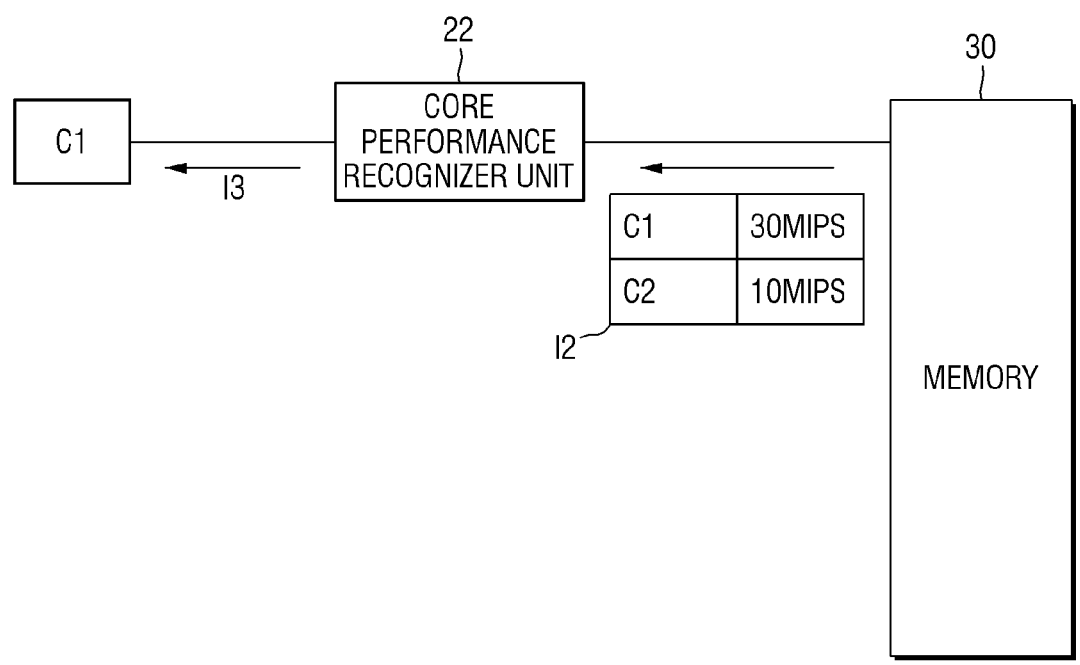
FIG. 12 is a diagram for illustrating another example of a method for recognizing processing speeds of multiple cores in a multi-core control system, according to some example embodiments of the present disclosure.

For another example, referring to FIG. 12, the first core C1 may request the core performance recognizer unit 22 for information indicating which one of the first core C1 and the second core C2 is faster. Upon receiving the request, the core performance recognizer unit 22 may read only the information I2 on the MIPS value of each of the first core C1 and the second core C2 among the multiple cores stored in memory 30. The core performance recognizer unit 22 may recognize the faster core between the first core C1 and the second core C2 based on the read information I2. When the core performance recognizer unit 22 recognizes that the first core C1 is the faster one, it may transmit information I3 to the first core C1 indicating that the first core C1 is the faster core.

Figure 13:
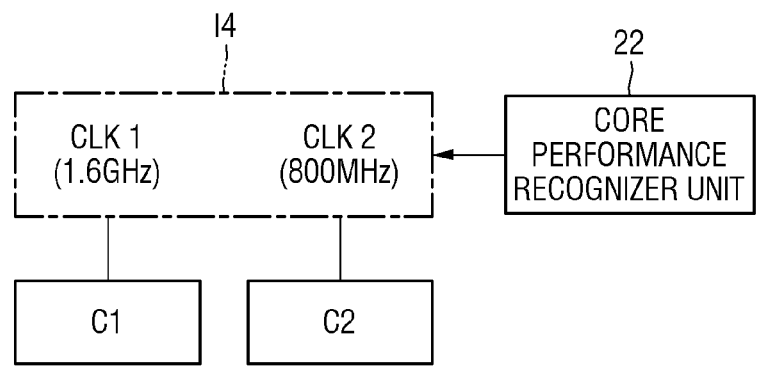
FIG. 13 is a diagram for illustrating another example of a method for recognizing processing speeds of multiple cores in a multi-core control system, according to some example embodiments of the present disclosure.

Referring to FIG. 13, in some embodiments, when the core performance recognizer unit 22 recognizes the faster core between the first core C1 and the second core C2, in addition to the information on the MIPS values of the first core C1 and the second core C2, the core performance recognizer unit 22 may further evaluate information I4 on the frequency of a first clock signal CLK1 supplied to the first core C1 and the frequency of a second clock signal CKL2 supplied to the second core C2. In a per-core DVFS architecture, the processing speed of each of multiple cores may vary depending on the frequency of a clock supplied to the respective multiple cores.

The core performance recognizer unit 22 may calculate the first processing speed of the first core C1 and the second processing speed of the second core C2 using the information I4 on the frequency of the first clock signal CLK1 supplied to the first core C1 and the frequency of the second clock signal CLK2 supplied to the second core C2.

The core performance recognizer unit 22 may determine the faster one between the first core C1 and the second core C2 using the calculated first processing speed and the calculated second processing speed, and may transmit to the first core C1 information indicating the faster core.

For example, if the frequency of the first clock signal CLK1 supplied to the first core C1 is 1.6 GHz, the MIPS value of the first core C1 is 30 MIPS, the frequency of the second clock signal CLK2 supplied to the second core C2 is 800 MHz, and the MIPS value of the second core C2 is 10 MIPS, the core performance recognizer unit 22 may calculate information indicating that the processing speed of the first core C1 is six times faster the processing speed of the second core C2. Then, the core performance recognizer unit 22 may transmit to the first core C1 information indicating that the first core C1 is faster based on the calculated information.

It is, however, to be understood that this is merely illustrative. The core performance recognizer unit 22 may transmit information on the calculated first processing speed and the calculated second processing speed to the first core C1, so that the first core C1 may determine which one of the first core C1 and the second core C2 has a faster processing speed.

Referring again to FIG. 7, when it is recognized that the first processing speed is not greater than the second processing speed (step S130, No), the first core C1 may wait until the second core C2 completes the execution of the second process P2 (step S140).

If it is recognized that the first processing speed is greater than the second processing speed (step S130, Yes), the first core C1 may reassign the second process P2 to the third core C3 so that the third core C3 having better performance executes the second process P2 (step S150). The third core C3 may have a third processing speed that is equal to or greater than the first processing speed. A method of reassigning the second process P2 to the third core C3 will be described in more detail with reference to FIGS. 14 to 19.

According to some example embodiments of the present disclosure, the first core C1 recognizes whether the first processing speed is greater than the second processing speed by a predetermined speed in step S130 of FIG. 7. The first core C1 may reassign the second process P2 to the third core C3 only if the first processing speed is greater than the second processing speed by the predetermined speed. This is to avoid excessive power consumption resulting from too many core reassignments.

According to some example embodiments of the present disclosure, if it is determined that the first processing speed is greater than the second processing speed in step S130 of FIG. 7, the first core C1 may wait for a second period of time until the second process P2 is completed (S135) then may reassign the second process P2 to the third core C3 (S150). The second period of time may be a predetermined period of time, and may be calculated to start when the determination is made that the first processing speed is greater than the second processing speed (e.g., step 130 of FIG. 7). This is also to avoid excessive power consumption resulted from too many core reassignments.

Figure 14:
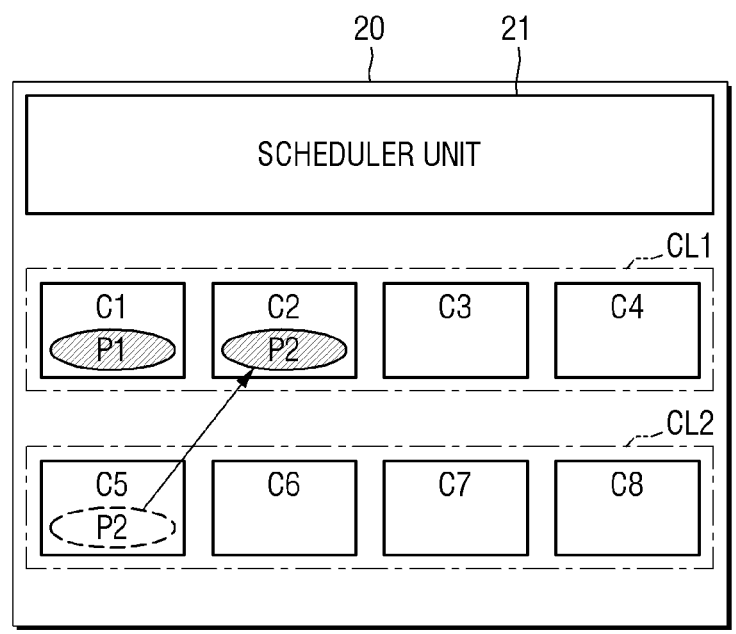
FIG. 14 is a diagram for illustrating an example of a method for reassigning processes in a multi-core control system, according to some example embodiments of the present disclosure.

FIG. 14 is a diagram for illustrating an example of a method for reassigning processes in a multi-core control system, according to some example embodiments of the present disclosure. For brevity, descriptions will be made focusing on differences from the example embodiment described above with reference to FIGS. 1 to 13, and the redundant description will be omitted. For example, although not illustrated, the multi-core control system 20 of FIG. 14 may include the core performance recognizer unit 22 and the process dependency recognizer unit 23.

Referring to FIG. 14, the multi-core control system 20 may include a scheduler unit 21, a first cluster CL1 including cores C1 to C4 each having a first processing speed, and a second cluster CL2 including cores C5 to C8 each having a second processing speed smaller than the first processing speed.

In an example where the first process P1 depends on the second process P2, the first core C1 executes the first process P1, and the fifth core C5 executes the second process P2, the first core C1 may request the scheduler unit 21 to reassign the second process P2 to a core different from the fifth core C5.

In response to the request, the scheduler unit 21 may reassign the second process P2 to one of the cores C1 to C4 in the first cluster CL1 including the first core C1.

For example, the scheduler unit 21 may reassign the second process P2 to the second core C2 included in the first cluster CL1. The second core C2 is one of the cores in the first cluster CL1 including the first core C1 and may have a processing speed equal to that of the first core C1.

When the second process P2 is reassigned to the second core C2, the second core C2 may execute the second process P2, rather than the fifth core C5.

Figure 15:
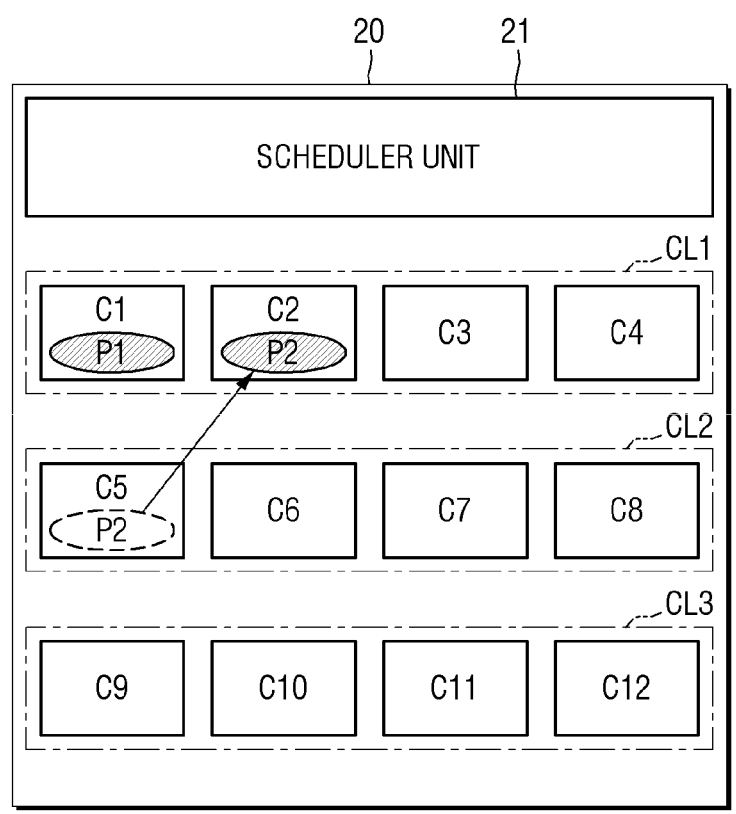
FIG. 15 is a diagram for illustrating another example of a method for reassigning processes in a multi-core control system, according to some example embodiments of the present disclosure.

FIG. 15 is a diagram for illustrating another example of a method for reassigning processes in a multi-core control system, according to some example embodiments of the present disclosure. For brevity, descriptions will be made focusing on differences from the example embodiment described above with reference to FIGS. 1 to 13, and the redundant description will be omitted. For example, although not illustrated, the multi-core control system 20 of FIG. 15 may include the core performance recognizer unit 22 and the process dependency recognizer unit 23.

Referring to FIG. 15, the multi-core control system 20 may include a scheduler unit 21, a first cluster CL1 including cores C1 to C4 each having a first processing speed, a second cluster CL2 including cores C5 to C8 each having a second processing speed smaller than the first processing speed, and a third cluster CL3 including cores C9 to C12 each having a processing speed smaller than the first processing speed and greater than the second processing speed.

In an example where the first process P1 depends on the second process P2, the first core C1 executes the first process P1, and the fifth core C5 executes the second process P2, the first core C1 may request the scheduler unit 21 to reassign the second process P2 to a core different from the fifth core C5.

Upon receiving a reassignment request, the scheduler unit 21 may reassign the second process P2 to one of the cores C1 to C4 in the first cluster CL1 (e.g., the second core C2). This is because the cores C1 to C4 included in the first cluster CL1 have the processing speed equal to that of the first core C1.

The scheduler unit 21 does not reassign the second process P2 to any one of the cores C9 to C12 included in the third cluster CL3. This is because the cores C9 to C12 included in the third cluster CL3 have a processing speed smaller than that of the first core C1.

When the second process P2 is reassigned to the second core C2, the second core C2 may execute the second process P2 instead of the fifth core C5.

Figure 16:
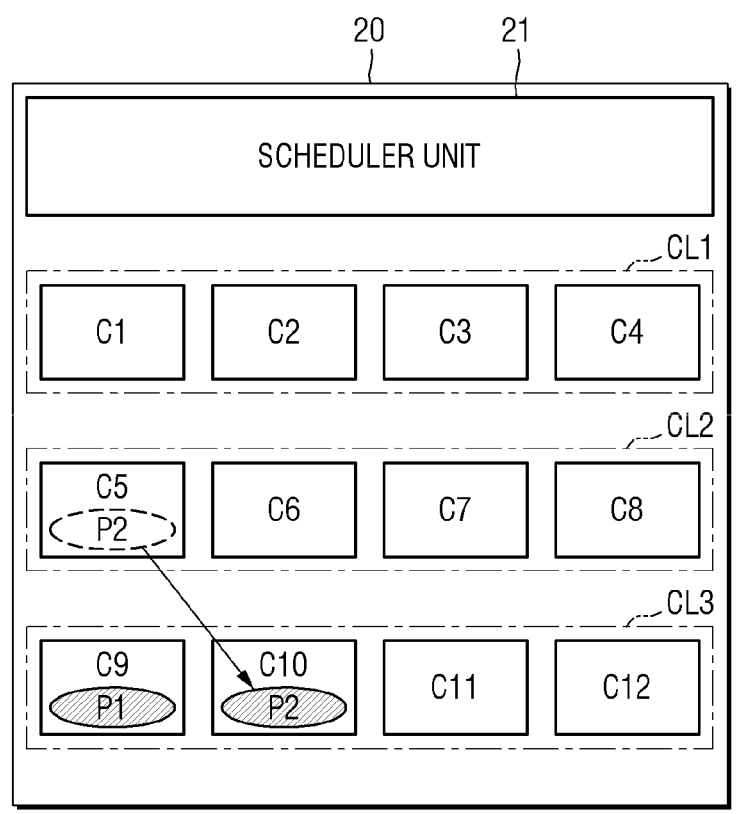
FIG. 16 is a diagram for illustrating another example of a method for reassigning processes in a multi-core control system, according to some example embodiments of the present disclosure.
Figure 17:
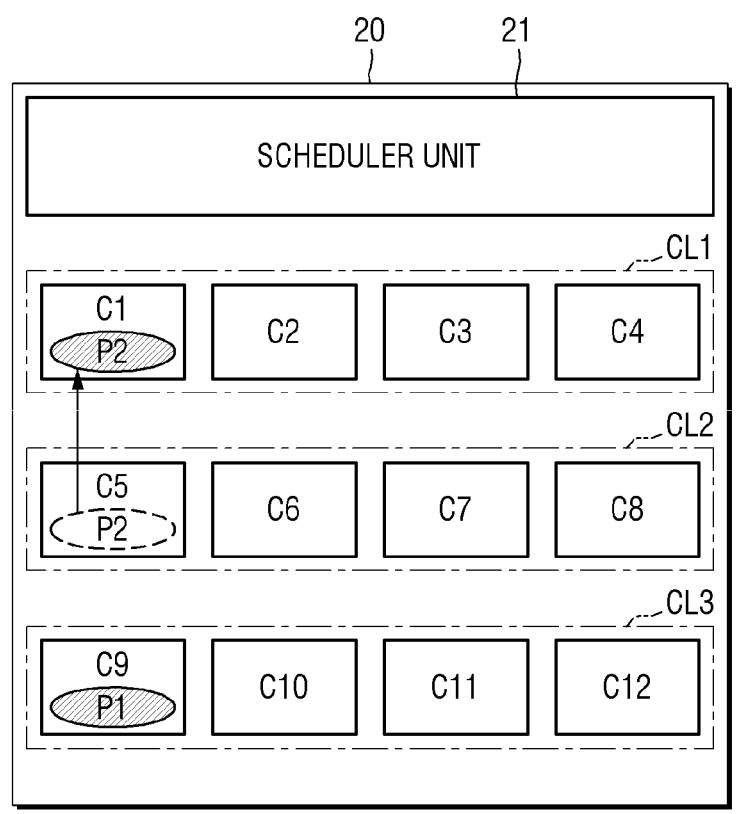
FIG. 17 is a diagram for illustrating another example of a method for reassigning processes in a multi-core control system, according to some example embodiments of the present disclosure.

FIGS. 16 and 17 are diagrams for illustrating yet another example of a method for reassigning processes in a multi-core control system, according to some example embodiments of the present disclosure. For brevity, descriptions will be made focusing on differences from the above example embodiments described with reference to FIGS. 1 to 13; and the redundant description will be omitted. For example, although not illustrated, the multi-core control system 20 of FIGS. 16 and 17 may include the core performance recognizer unit 22 and the process dependency recognizer unit 23.

Referring to FIGS. 16 and 17, the multi-core control system 20 may include a scheduler unit 21, a first cluster CL1 including cores C1 to C4 each having a first processing speed, a second cluster CL2 including cores C5 to C8 each having a second processing speed smaller than the first processing speed, and a third cluster CL3 including cores C9 to C12 each having a third processing speed smaller than the first processing speed and greater than the second processing speed.

In the example where the first process P1 depends on the second process P2, the first core C9 executes the first process P1, and the fifth core C5 executes the second process P2, the ninth core C9 may request the scheduler unit 21 to reassign the second process P2 to a core different from the fifth core C5.

Referring to FIG. 16, in one exemplary embodiment, upon receiving a reassignment request, the scheduler unit 21 may reassign the second process P2 to one of the cores C9 to C12 in the third cluster CL3 (e.g., the tenth core C10). This is because the cores C9 to C12 included in the third cluster CL3 have the processing speed equal to that of the ninth core C9. When the second process P2 is reassigned to the tenth core C10, the tenth core C10 may execute the second process P2 in place of the fifth core C5.

Referring to FIG. 17, in another exemplary embodiment, and assuming that the first process P1 depends on the second process P2, upon receiving a reassignment request, the scheduler unit 21 may reassign the second process P2 to one of the cores C1 to C4 in the first cluster CL1 (e.g., the first core C1). This is because the cores C1 to C4 included in the first cluster CL1 have the processing speed greater than that of the ninth core C9. When the second process P2 is reassigned to the first core C1, the first core C1 may execute the second process P2 in place of the fifth core C5.

Figure 18:
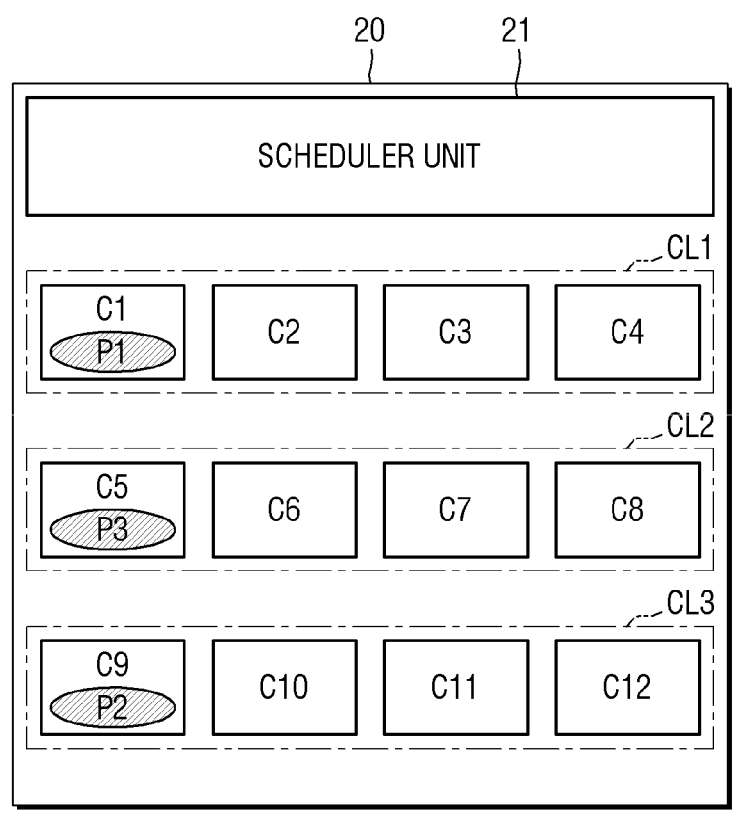
FIG. 18 is a diagram for illustrating another example of a method for reassigning processes in a multi-core control system according to some example embodiments of the present disclosure.

FIG. 18 is a diagram for illustrating still another example of a method for reassigning processes in a multi-core control system according to some example embodiments of the present disclosure. For brevity, descriptions will be made focusing on differences from the example embodiment described above with reference to FIGS. 1 to 13, and the redundant description will be omitted. For example, although not illustrated, the multi-core control system 20 of FIG. 18 may include the core performance recognizer unit 22 and the process dependency recognizer unit 23.

Referring to FIG. 18, the multi-core control system 20 may include a scheduler unit 21, a first cluster CL1 including cores C1 to C4 each having a first processing speed, a second cluster CL2 including cores C5 to C8 each having a second processing speed smaller than the first processing speed, and a third cluster CL3 including cores C9 to C12 each having a processing speed smaller than the first processing speed and greater than the second processing speed.

In the example where the first process P1 and the second process P2 depend on the third process P3, the first core C1 executes the first process P1, the ninth core C5 executes the second process P2, and the fifth core C5 executes the third process P3, the first core C1 and/or the ninth core C9 may request the scheduler unit 21 to reassign the third process P3 to a core different from the fifth core C5.

According to some example embodiments of the present disclosure, upon receiving a reassignment request, the scheduler unit 21 may determine the priorities of the first core C1 and the ninth core C9 and may search for a target core to which the third process P3 is to be reassigned. In some embodiments, each of the cores C1 to C9 may be ranked according to their relative priorities (e.g., highest priority to lowest priority) based on one or more factors of the cores C1 to C9, such as, for example, speed, workload, reliability, etc., and process can be migrated between the cores based on the priority.

For example, when the ninth core C9 has a higher priority, the scheduler unit 21 may determine one of the cores C9 to C12 included in the third cluster CL3 to be a target core, and may reassign the third process P3 to the determined target core.

As another example, when the ninth core C9 has a higher priority, the scheduler unit 21 may determine one of the cores C1 to C4 included in the first cluster CL1 to be a target core, and may reassign the third process P3 to the determined target core.

As yet another example, when the first core C1 has a higher priority, the scheduler unit 21 may determine one of the cores C1 to C4 included in the first cluster CL1 to be a target core, and may reassign the third process P3 to the determined target core.

It is to be noted that when the first core C1 has a higher priority, the scheduler unit 21 may determine that none of the cores C9 to C12 included in the third cluster CL3 is a target core. This is because the cores C9 to C12 included in the third cluster CL3 are slower than the first core C1 and thus they cannot be used to prevent the degradation in the performance of the first core C1.

According to some example embodiments of the present disclosure, upon receiving a reassignment request, the scheduler unit 21 may identify the faster one between the first core C1 and the ninth core C9 to determine a target core to which the third process P3 is reassigned.

Since the first core C1 has a greater processing speed, the scheduler unit 21 may determine one of the cores C1 to C4 included in the first cluster CL1 as a target core, and may reassign the third process P3 to the determined target core.

Figure 19:
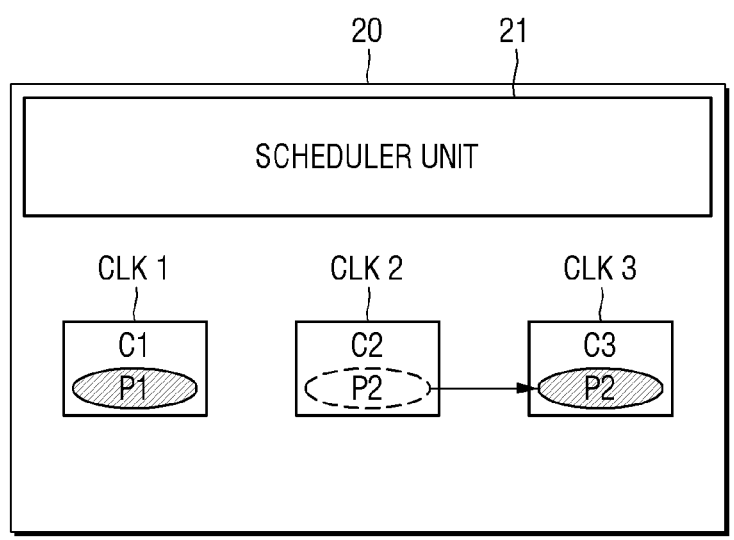
FIG. 19 is a diagram for illustrating another example of a method for reassigning processes in a multi-core control system, according to some example embodiments of the present disclosure.

FIG. 19 is a diagram for illustrating yet another example of a method for reassigning processes in a multi-core control system according to some example embodiments of the present disclosure. For brevity, descriptions will be made focusing on differences from the example embodiment described above with reference to FIGS. 1 to 13, and the redundant description will be omitted.

Referring to FIG. 19, it is assumed that the second processing speed of the second core C2 is smaller than the first processing speed of the first core C1, and that the third processing speed of the third core C3 is equal to or greater than the first processing speed.

Referring to FIG. 19, the multi-core control system 20 may include a scheduler unit 21, a first core C1, a second core C2, and a third core C3. Although not illustrated, in some embodiments, the multi-core control system 20 of FIG. 19 may include the core performance recognizer unit 22 and the process dependency recognizer unit 23. The first core C1 may receive a first clock signal CLK1 having a first frequency, the second core C2 may receive a second clock signal CLK2 having a second frequency, and the third core C3 may receive a third clock signal CLK3 having a third frequency.

In the example where the first process P1 depends on the second process P2, the first core C1 executes the first process P1, and the second core C2 executes the second process P2, the first core C1 may request the scheduler unit 21 to reassign the second process P2 to a core different from the second core C2.

In response to the reassignment request, the scheduler unit 21 may reassign the second process P2 to the third core C3. This is because the third core C3 has a processing speed equal to or greater than that of the first core C1.

When the second process P2 is reassigned to the third core C3, the third core C3 may execute the second process P2 in place of the second core C2.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A multi-core control system comprising:
   multiple cores, including a first core and a second core; and
   a process dependency recognizer unit configured to identify a dependency between a first process executed in the first core and a second process executed in the second core, the first process being dependent on the second process,
   wherein the multi-core control system is configured such that when the first core waits for a first length of time to execute the first process, the first core transmits to the process dependency recognizer unit a request to identify the second process, and
   wherein, in response to the request to identify the second process transmitted from the first core, the process dependency recognizer unit identifies the second process, and transmits to the first core information identifying the second process.

2. The system of claim 1, wherein the multi-core control system is configured such that when the first core determines that the first process depends on the second process executed by the second core, the first core evaluates a first processing speed of the first core and a second processing speed of the second core.

3. The system of claim 2, wherein the first core determines the first processing speed and the second processing speed using speed information on a million instructions per second (MIPS) value of each of the multiple cores stored in a memory.

4. The system of claim 2, further comprising:
a core performance recognizer unit, wherein the core performance recognizer unit is configured to identify speed information on a million instructions per second (MIPS) value of each of the multiple cores stored in a memory, identify frequency information on frequencies of clock signals provided to each of the first core and the second core, and calculate the first processing speed and the second processing speed based on at least one of the speed information and the frequency information,
wherein the first core evaluates the first processing speed and the second processing speed calculated by the core performance recognizer unit.

5. The system of claim 2, wherein the process dependency recognizer unit is further configured to determine that the first process depends on the second process if an execution result of the second process is used in an execution of the first process.

6. The system of claim 2, wherein the process dependency recognizer unit is further configured to determine that the first process depends on the second process if the first process waits to acquire a shared resource occupied by the second process during execution of the first process.

7. The system of claim 2, wherein if the first processing speed is greater than the second processing speed, the first core identifies a target core that is to execute the second process in place of the second core.

8. The system of claim 7, wherein the target core is included in the multiple cores, and
wherein the target core has a third processing speed equal to or greater than the first processing speed.

9. The system of claim 7, further comprising:
a scheduler unit configured to assign processes to each of the multiple cores,
wherein the first core requests the scheduler unit to reassign the second process to the target core.

10. The system of claim 9, wherein after the first core evaluates the first processing speed and the second processing speed, the first core waits for a second length of time until the second process is completed, and the first core requests the scheduler unit to reassign the second process to the target core.

11. The system of claim 2,
wherein the first core is configured to evaluate the first processing speed and the second processing speed to determine if the first processing speed is greater than the second processing speed, and
wherein if the first core determine that the first processing speed is not greater than the second processing speed, the first core waits until the second process is executed in the second core.

12. A multi-core control system comprising:
a first core having a first processing speed;
a second core having a second processing speed; and
a scheduler unit configured to assign a first process to the first core and a second process to the second core, the first process depending on the second process,
wherein the multi-core control system is configured such that:
when the first core waits for a first length of time to execute the first process, the first core evaluates the first processing speed and second processing speed and determines if the first processing speed is greater than the second processing speed, and
when the first core determines that the first processing speed is greater than the second processing speed, the first core requests the scheduler unit to reassign the second process to a third core that has a third processing speed greater than the second processing speed.

13. The system of claim 12, wherein after the first core evaluates the first processing speed and the second processing speed, the first core waits for a second length of time until the second core completes execution of the second process, and the first core requests the scheduler unit to reassign the second process to the third core.

14. The system of claim 12, wherein if the first core determines that the first processing speed is not greater than the second processing speed, the first core waits until execution of the second process by the second core is completed.

15. The system of claim 12, comprising:
a process dependency recognizer unit configured to identify a dependent relationship between the first process and the second process,
wherein the multi-core control system is configured such that:
if the first core waits for the first length of time to execute the first process, the first core determines if the second process depends on the first process based on information received from the process dependency recognizer unit.

16. The system of claim 15, configured such that if the first core determines that the second process depends on the first process, the first core determines if the first processing speed is greater than the second processing speed.

17. The system of claim 15, wherein the first core determines the first processing speed and the second processing speed using speed information on a million instructions per second (MIPS) value of each of multiple cores stored in a memory, and
wherein the first core and the second core are included in the multiple cores.

18. The system of claim 15, further comprising:
a core performance recognizer unit, wherein the core performance recognizer unit is configured to identify speed information on a million instructions per second (MIPS) value of each of multiple cores stored in a memory, identify frequency information on frequencies of clock signals provided to each of the first core and the second core, and calculate the first processing speed and the second processing speed based on at least one of the speed information and the frequency information,
wherein the first core evaluates the first processing speed and the second processing speed calculated by the core performance recognizer unit.

19. The system of claim 12, wherein the third processing speed is equal to or greater than the first processing speed.

20. A system-on-chip comprising:
an interface configured to receive a task request from a host;

a first core and a second core, each configured to execute the task request; and a scheduler unit configured to assign a first process to the first core and a second process to the second core, wherein the first process is associated with the requested task, and the second process is associated with the requested task and precedes the first process in a processing order, wherein the first core is configured to:

determine if the first process depends on the second process, if the first core waits for a first period of time to execute the first process, determine if a first processing speed of the first core is greater than a second processing speed of the second core, if the first core determines that the first process depends on the second process, and request the scheduler unit to reassign the second process to a third core having a third processing speed greater than the second processing speed, if the first core determines that the first processing speed is greater than the second processing speed.

\* \* \* \* \*